United States Patent [19]

Tyrell et al.

[11] 4,393,190

[45] Jul. 12, 1983

[54] CARBONATE COPOLYMERS PREPARED FROM IMIDE REACTANTS

[75] Inventors: John A. Tyrell; Gary L. Freimiller, both of Mt. Vernon, Ind.

[73] Assignee: General Electric Company, Mt. Vernon, Ind.

[21] Appl. No.: 303,998

[22] Filed: Sep. 21, 1981

[51] Int. Cl.³ .................. C08G 63/62; C08G 63/68; C08G 73/10; C08G 73/16

[52] U.S. Cl. .................. 528/170; 524/602; 524/611; 528/125; 528/126; 528/128; 528/172; 528/173; 528/176; 528/182; 528/191; 528/193; 528/194; 528/196; 528/198; 528/199; 528/202; 528/203; 528/204

[58] Field of Search .............. 528/170, 176, 182, 194, 528/172, 173, 191, 193, 125, 126, 128, 196, 198, 199, 202, 203, 204

[56] References Cited

U.S. PATENT DOCUMENTS

| | | | |
|---|---|---|---|
| 3,536,670 | 10/1970 | Aelony et al. | 528/170 |
| 3,567,685 | 3/1971 | Bialous et al. | 260/47 |
| 3,652,715 | 3/1972 | Holub et al. | 260/860 |
| 3,729,446 | 4/1973 | Holub et al. | 260/47 Z |
| 3,770,697 | 11/1973 | Holub et al. | 260/47 XA |
| 3,833,681 | 9/1974 | Holub et al. | 260/824 R |

Primary Examiner—Lester L. Lee
Attorney, Agent, or Firm—Martin B. Barancik

[57] ABSTRACT

Novel carbonate polymers comprised of the reaction product of a dihydric phenol, a carbonate precursor, and at least one imide selected from the group of compounds represented by the formulae

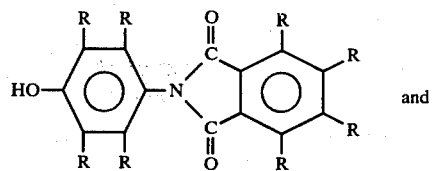 and

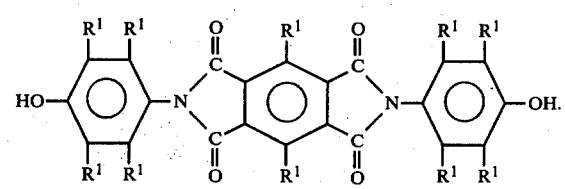

22 Claims, No Drawings

CARBONATE COPOLYMERS PREPARED FROM IMIDE REACTANTS

FIELD OF THE INVENTION

This invention is directed to novel carbonate copolymers, and in particular to novel carbonate copolymers prepared by reacting at least one dihydric phenol, at least one particular cyclic hydroxy imide and a carbonate precursor.

BACKGROUND OF THE INVENTION

Polycarbonates are a class of known thermoplastics that, due to their many advantageous properties, are utilized in many commercial and industrial applications, particularly as engineering thermoplastics. They are a member of the tough thermoplastic family and exhibit many excellent properties such as toughness, flexibility, impact resistance, and high heat distortion temperatures. The polycarbonates are generally prepared by reacting a dihydric phenol with a carbonate precursor such as phosgene. However, while the polycarbonates enjoy many excellent properties they have certain drawbacks in that they are somewhat susceptible to attack by certain chemicals such as carbon tetrachloride, gasoline, phosphate esters, and the like.

It is, therefore, an object of this invention to provide carbonate polymers which exhibit improved resistance to certain chemicals while simultaneously retaining substantially all of the other advantageous properties possessed by polycarbonates derived from dihydric phenols such as high heat distortion temperatures, toughness, flexibility, impact resistance, and the like.

DESCRIPTION OF THE INVENTION

The novel carbonate copolymers of the instant invention are obtained by reacting, as essential components, at least one dihydric phenol, a carbonate precursor, and at least one particular cyclic hydroxy imide. The particular cyclic hydroxy imides employed in the production of the carbonate polymers of the instant invention are selected from the group of compounds represented by the general formula

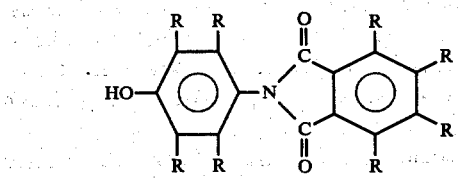

and

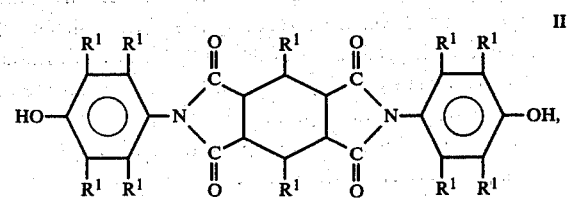

and mixtures thereof.

In Formula I each R is independently selected from the group consisting of hydrogen, alkyl radicals, halogen radicals, and alkoxy radicals. Preferred alkyl radicals are the lower alkyl radicals, preferably those containing from 1 to about 6 carbon atoms. Illustrative of these preferred lower alkyl radicals are methyl, ethyl, propyl, isopropyl, butyl, isobutyl, and the like. Preferred alkoxy radicals are the lower alkoxy radicals, preferably those containing from 1 to about 6 carbon atoms. Illustrative of these preferred lower alkoxy radicals are methoxy, ethoxy, propoxy, isopropoxy, butoxy, pentoxy, and the like. Preferred halogen radicals are chlorine and bromine.

In Formula II each $R^1$ is independently selected from the group consisting of hydrogen, alkyl radicals, halogen radicals, and alkoxy radicals. Preferred alkyl radicals are the lower alkyl radicals, preferably those containing from 1 to about 6 carbon atoms. Preferred halogen radicals are chlorine and bromine. Preferred alkoxy radicals are the lower alkoxy radicals, preferably those containing from 1 to about 6 carbon atoms.

The cyclic monohydroxy imides of Formula I are generally known and described in the prior art, and may be readily prepared by known methods.

These cyclic monohydroxy imides can in general be prepared by reacting one mole of a phthalic anhydride of the general formula

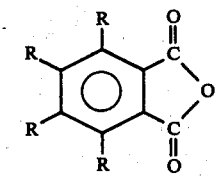

with one mole of an amino phenol of the general formula

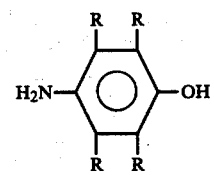

wherein R is as defined above.

The cyclic dihydroxy diimides of Formula II are likewise generally known and described in the prior art, and may readily be prepared by known methods.

These cyclic dihydroxy diimides can generally be prepared by reacting one mole of a benzene tetracarboxylic acid anhydride of the formula

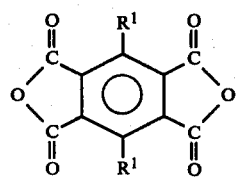

with two moles of an amino phenol of the formula

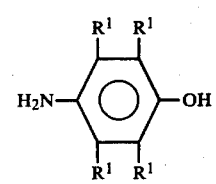

wherein $R^1$ is as defined above.

In producing the carbonate polymers of the instant invention only one compound of Formula I or only one compound of Formula II may be used. Alternately, a mixture of two or more compounds of Formula I, or a mixture of two or more compounds of Formula II may be used. Likewise, mixtures of one compound of Formula I and one compound of Formula II may also be used. Mixtures of one or more compounds of Formula I and one or more compounds of Formula II may also be utilized.

The dihydric phenols that may be employed in the practice of this invention are any of the well known dihydric phenols. Illustrative of these dihydric phenols are those disclosed in U.S. Pat. Nos. 3,028,365; 2,999,835; 3,030,331 and 3,169,121, all of which are hereby incorporated herein by reference.

In general these dihydric phenols are represented by the general formula

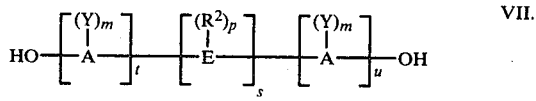

VII.

in which A is an aromatic group such as phenylene, biphenylene, naphthylene, anthylene, etc. E may be an alkylene or alkylidene group such as methylene, ethylene, propylene, propylidene, isopropylidene, butylene, butylidene, isobutylidene, amylene, isoamylene, amylidene, isoamylidene, etc. Where E is an alkylene or alkylidene group, it may also consist of two or more alkylene or alkylidene groups connected by a non-alkylene or non-alkylidene group such as an aromatic linkage, an ether linkage, a carbonyl linkage, a silicon-containing linkage, or by a sulfur-containing linkage such as a sulfide, sulfoxide, sulfone, etc. In addition E may be a cycloaliphatic group such as cyclopentyl, cyclohexyl, etc., a sulfur-containing linkage such as sulfide, sulfoxide, or sulfone, an ether linkage, a carbonyl group, or a silicon-containing linkage such as silane or siloxy. $R^2$ is hydrogen or a monovalent hydrocarbon group such as alkyl (methyl, ethyl, propyl, etc.), aryl (phenyl, naphthyl, etc.), aralkyl (benzyl, ethylphenyl, etc.), or cycloaliphatic (cyclopentyl, cyclohexyl, etc.). Y may be an inorganic atom such as chlorine, bromine, fluorine, etc., an inorganic group such as the nitro group, etc., an organic group such as $R^2$ above, or an oxy group such as $OR^2$, it being only necessary that Y be inert to and unaffected by the reactants and the reaction conditions. The letter m is any whole number from and including zero through the number of positions on A available for substitution. The letter p is any whole number from and including zero through the number of available positions on E for substitution. The letter t is a whole number equal to at least one, s is either zero or one, and u is any whole number including zero.

In the dihydric phenol compound represented by Formula VII, when more than one Y substituent is present, they may be the same or different. The same is true for the $R^2$ substituent. Where s is zero in Formula VII and u is not zero, the aromatic rings are directly joined with no intervening alkylene or other bridge. The positions of the hydroxyl groups and Y on the aromatic nuclear residues can be varied in the ortho, meta, or para positions and the groupings can be in a vicinal, asymmetrical or symmetrical relationship, where two or more ring carbon atoms of the aromatic hydrocarbon residue are substituted with Y and hydroxyl group.

Preferred dihydric phenols for the purposes of the instant invention are those represented by the general formula

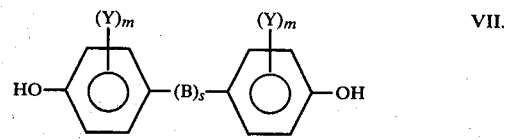

VII.

wherein Y, m and s are as defined above; and B is an alkylene, cycloalkylene, alkylidene or cycloalkylidene group.

Some nonlimiting illustrative examples of these preferred dihydric phenols include:
2,2-bis(4-hydroxyphenyl)propane;
1,1-bis(4-hydroxyphenyl)cyclohexane;
4,4'-dihydroxydiphenyl;
1,1-bis(4-hydroxy-2-chlorophenyl)ethane;
2,2-bis(4-hydroxyphenyl)pentane; and the like.

In the practice of the present invention it is, of course, possible to employ two or more different dihydric phenols or a copolymer of a dihydric phenol with a glycol, a hydroxy or an acid-terminated polyester, or a dibasic acid and a dihydric phenol for use in the preparation of the novel carbonate polymers of the instant invention.

The carbonate precursor can be either a carbonyl halide, a diarylcarbonate or a bishaloformate. For the purposes of the present invention the carbonyl halides are preferred. The carbonyl halides include carbonyl bromide, carbonyl chloride, and mixtures thereof. Carbonyl chloride, also known as phosgene, is the preferred carbonyl halide.

One embodiment of the instant invention is directed to novel carbonate polymers having as terminal or end groups particular cyclic imides. These novel carbonate polymers are formed by reacting a dihydric phenol of Formula VII, preferably a dihydric phenol of Formula VIII, with the cyclic hydroxy imide of Formula I, and a carbonate precursor, preferably phosgene.

Generally, this carbonate polymer will contain repeating units having the structure

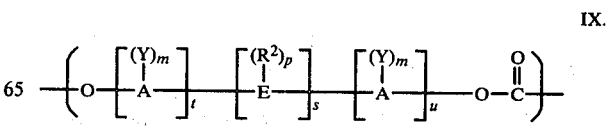

IX.

and terminal units of the structure

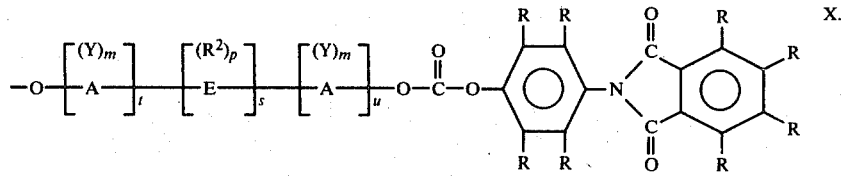

wherein Y, A, E, m, p, t, s, u, $R^2$ and R are all as defined above.

Instead of utilizing only one particular compound of Formula I it is, of course, possible to employ a mixture of two or more different compounds of Formula I. If such a mixture is employed the resulting carbonate polymer will contain a mixture of different terminal units of Formula X. Additionally, the compounds of Formula I may be used in conjunction with known phenol, such as phenol itself, tertiarybutyl phenol, and the like, chain terminators or end capping agents. In such a case the polymer will contain a mixture of chemically different terminal units, i.e., those derived from the reaction of the compound of Formula I with the dihydric phenol and the carbonate precursor, and those derived from the reaction of the known end capping agent with the carbonate precursor and the dihydric phenol. The amount of the particular end capping agent used is determinative of the ratio of the resultant terminal groups present in the polymer.

By utilizing the chain terminators or end capping agents of Formula I the weight average molecular weight of the polycarbonate can be controlled, for example, between about 1,000 and about 200,000, depending upon the amount of the compound of Formula I employed. Generally, the more of compound of Formula I present in the reaction mixture, i.e., the dihydric phenol, the carbonate precursor, and the compound of Formula I, the lower the molecular weight of the resultant carbonate polymer. Conversely, the less of the compound of Formula I employed in the reaction mixture, the higher the molecular weight of the carbonate polymer. The amount of the compound of Formula I utilized is a chain terminating amount. By chain terminating amount is meant an amount effective to terminate the chain growth before the molecular weight of the carbonate polymer gets too high, but insufficient to terminate the chain before a polymer of useful molecular weight is obtained. If the molecular weight of the carbonate polymer is too high, the polymer exhibits a viscosity too high for any practical application of the polymer. Conversely, if the molecular weight of the polymer is too low, the polymer exhibits a viscosity too low for any practical application of the polymer. Generally, the amount of the compound of Formula I employed is an amount effective to produce a carbonate polymer having an average molecular weight in the range of from about 10,000 to about 60,000, preferably in the range from about 25,000 to about 50,000. In general, this amount ranges from about 0.1 to about 10 mole percent of the compound of Formula I based on the amount of dihydric phenol present.

Another embodiment of the instant invention is directed to carbonate copolymers obtained by reacting a dihydric phenol of Formula VII, a cyclic dihydroxy diimide represented by Formula II, and a carbonate precursor. These carbonate copolymers contain repeating units represented by structures IX, as defined above, and XI

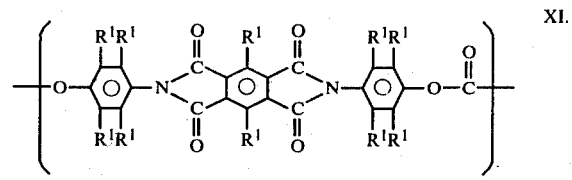

wherein $R^1$ is as defined above.

In the preparation of these carbonate copolymers the amount of the diimide of Formula II employed generally ranges from about 1 to about 85 mole percent, based on the amount of dihydric phenol present, preferably from about 5 to about 75 mole percent, and more preferably from about 10 to about 50 mole percent.

In this embodiment of the instant invention only one diimide of Formula II may be employed. Alternately, a mixture of two or more diimides of Formula II may also be utilized.

Still another embodiment of the instant invention is directed to carbonate copolymers which contain imide terminal groups. These imide terminated carbonate copolymers are obtained by reacting a dihydric phenol of Formula VII, a cyclic dihydroxy diimide of Formula II, a cyclic monohydroxy imide of Formula I, and a carbonate precursor. These imide terminated carbonate copolymers contain repeating units represented by structures IX and XI, and terminal units represented by structures X and XII

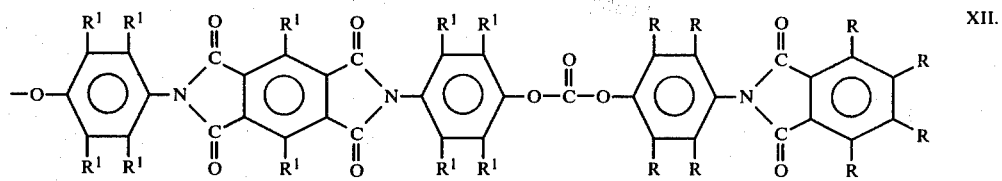

wherein $R^1$ and R are as defined above.

In this embodiment only one imide of Formula I and one diimide of Formula II may be used. Alternately, one imide of Formula I and a mixture of two or more diimides of Formula II, or one diimide of Formula II and a mixture of two or more imides of Formula I, or a mixture of two or more diimides of Formula II and a mixture of two or more imides of Formula I may be utilized.

The amount of the diimide of Formula II employed generally ranges from about 1 to about 85 mole percent, based on the amount of dihydric phenol present. The amount of the imide of Formula I employed is a chain terminating or molecular weight regulating amount. Generally, this amount ranges from about 0.1 to about 10 mole percent, based on the total amount of the dihydric phenol and the diimide of Formula II present.

The method for preparing the aromatic carbonate polymers of the instant invention, when employing phosgene as the carbonate precursor, involves passing phosgene into a reaction mixture containing a dihydric phenol, an acid acceptor, and at least one compound selected from the imides of Formula I and the diimides of Formula II.

A suitable acid acceptor may be either organic or inorganic in nature. A useful organic acid acceptor is a tertiary amine and includes such materials as pyridine, triethylamine, dimethylaniline, tributylamine, and the like. The inorganic acid acceptor may be one which can be either a hydroxide, a carbonate, a bicarbonate, a phosphite, or an alkali or alkaline earth metal hydroxide. Also present in the reaction mixture may be a catalyst. The catalysts which are employed herein can be any of the suitable and well known catalysts that aid the polymerization of the dihydric phenol with phosgene. Suitable catalysts include tertiary amines, quaternary ammonium compounds, quaternary phosphonium compounds, amidines, and the like.

In the instances where the imide chain terminator of Formula I is not present, a chain terminator or molecular weight regulator such as phenol or tertiary butyl phenol may also be present to control the molecular weight of the carbonate polymer.

The temperature at which the phosgenation reaction proceeds may vary from below 0° C. to above 100° C. The reaction proceeds satisfactorily at temperatures from room temperature (25° C.) to 50° C. Since the reaction is exothermic, the rate of phosgene addition may be used to control the reaction temperature. The amount of phosgene required will generally depend upon the amount of the dihydric phenol and the diimide of Formula II present. Generally speaking, one mole of phosgene will react with one mole of the dihydric phenol and the diimide of Formula II to provide the polymer and two moles of HCl. The two moles of HCl are in turn "attached" by the acid acceptor present. The foregoing amounts are herein referred to as stoichiometric or theoretical amounts.

The compositions of the present invention may optionally contain other commonly known and used additives such as antioxidants; antistatic agents; mold release agents; colorants; glass fibers; impact modifiers; ultraviolet radiation absorbers such as the benzophenones and the benzotriazoles; fillers; plasticizers; hydrolytic stabilizers such as the epoxides disclosed in U.S. Pat. Nos. 3,489,716, 4,138,379 and 3,839,247, all of which are incorporated herein by reference; color stabilizers such as the organophosphites disclosed in U.S. Pat. Nos. 3,305,520 and 4,118,370, both of which are incorporated herein by reference; and flame retardants.

Some particularly useful flame retardants are the alkali metal salts of sulfonic acid and the alkaline earth metal salts of sulfonic acid. These types of flame retardants are disclosed in U.S. Pat. Nos. 3,933,734; 3,948,851; 3,926,908; 3,919,167; 3,909,490; 3,953,396; 3,931,100; 3,978,024; 3,953,399; 3,917,559; 3,951,910; and 3,940,366, all of which are hereby incorporated herein by reference.

Also included with the scope of the instant invention are copolyester-carbonate polymers obtained by reacting a dihydric phenol, a difunctional aromatic carboxylic acid, a carbonate precursor, and at least one compound selected from the group consisting of the imides of Formula I and the diimides of Formula II.

The copolyester-carbonate polymers of the instant invention may be defined as polymers containing recurring carbonate groups

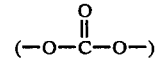

carboxylate groups

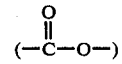

and aromatic carbocyclic groups in the linear polymer chain, in which at least some of the carboxylate groups and at least some of the carbonate groups are bonded directly to ring carbon atoms of the aromatic carbocyclic groups.

The copolyester-carbonate polymers of the instant invention are prepared by reacting, as essential ingredients, a dihydric phenol, a carbonate precursor, a difunctional aromatic carboxylic acid or its reactive derivative, and at least one compound selected from the class consisting of the imides of Formula I and the diimides of Formula II.

In general, any difunctional carboxylic acid conventionally used in the preparation of linear polyesters may be used for the preparation of the copolyester-carbonate polymers of the instant invention. Such acids are disclosed in U.S. Pat. No. 3,169,121, which is incorporated herein by reference. The preferred difunctional carboxylic acids are the difunctional aromatic carboxylic acids represented by the general formula

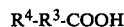   XIII wherein $R^3$ is an aromatic radical such as phenylene, naphthylene, biphenylene, substituted phenylene, and the like; two or more aromatic groups connected through non-aromatic linkages such as alkylene, alkylidene, cycloalkylene, and cycloalkylidene; an aralkyl radical such as tolylene, xylene, and the like. $R^4$ in Formula XIII represents either a carboxyl or a hydroxyl group.

A preferred difunctional aromatic carboxylic acid is an aromatic dicarboxylic acid, i.e., wherein $R^4$ is a carboxyl group. These aromatic dicarboxylic acids are represented by the general formula

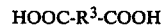   XIV wherein $R^3$ is as defined above.

Some useful aromatic dicarboxylic acids include phthalic acid, isophthalic acid, terephthalic acid, and mixtures thereof. A particularly useful aromatic dicarboxylic acid comprises a mixture of isophthalic acid and terephthalic acid. A particularly useful mixture of isophthalic acid and terephthalic acid is one wherein the mole ration of isophthalic acid to terephthalic acid is in the range of from 1:10 to about 10:1.

Instead of using the acid per se, a reactive derivative of the acid may be utilized. Illustrative of the reactive derivatives of the aromatic dicarboxylic acids are the diacid halides such as the diacid chlorides., e.g., phthaloyl chloride, isophthaloyl chloride, terephthaloyl chloride, etc.

When one or more compounds of Formula II are reacted with a dihydric phenol, a carbonate precursor such as phosgene, and a difunctional carboxylic acid such as an aromatic dicarboxylic acid represented by Formula XIV or its reactive derivative the resulting copolyester-carbonate polymer contains repeating units of structures IX, XI,

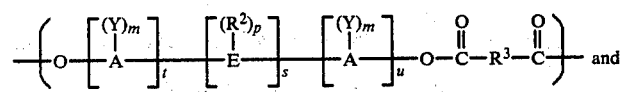

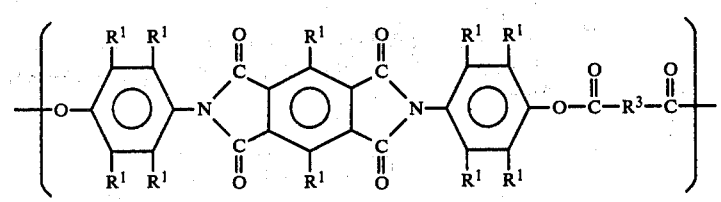

When one or more chain terminating or end capping compounds of Formula I are reacted with a dihydric phenol, a carbonate precursor such as phosgene, and a difunctional carboxylic acid such as an aromatic dicarboxylic acid represented by Formula XIV or its reactive derivative the resultant copolyester-carbonate polymer will contain repeating units represented by structures IX and XV, and terminal units represented by structures X and

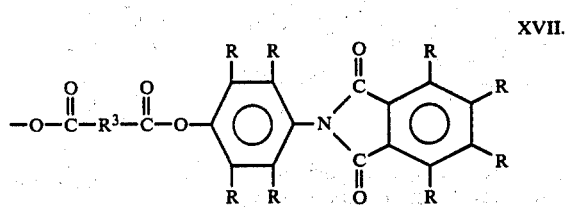

When a mixture of one or more end capping compounds of Formula I and one or more compounds of Formula II are reacted with a dihydric phenol, a carbonate precursor such as phosgene, and a difunctional carboxylic acid such as an aromatic dicarboxylic acid represented by Formula XIV or its reactive derivative the copolyester-carbonate polymer produced contains repeating units represented by structures IX, XI, XV and XVI, and terminal units represented by structures X, XII and XVII.

some useful methods for the preparation of copolyester-carbonates in general are disclosed in U.S. Pat. No. 3,169,121, which is incorporated herein by reference. The preferred method of preparing the copolyester-carbonates of the instant invention involves the reaction of a carbonate precursor such as phosgene, a dihydric phenol, a cyclic hydroxy imide of Formula I and/or II, and a difunctional carboxylic acid such as an aromatic dicarboxylic acid or its reactive derivative. The proportion of carboxylate and carbonate groups present in the final polymer can be suitably varied by varying the molar ratio of the dihydric phenol and the cyclic hydroxy imide of Formula II to difunctional carboxylic acid or its reactive derivative. Where a dicarboxylic acid is used, it is preferred that this molar ratio of dihydric phenol and cyclic hydroxy imide of Formula II to dicarboxylic acid or its reactive derivative be more than one, and preferably in the range of 1.00:0.05 to about 1.00:0.70. The amount of carbonate precursor such as phosgene utilized is an amount effective to react with substantially all of the remaining unreacted hydroxy groups of the dihydric phenol and the cyclic hydroxy imide.

These copolyester-carbonate polymers may optionally contain admixed therewith the commonly known and utilized additives such as those described hereinabove, e.g., antioxidants, ultraviolet radiation absorbers, mold release agents, fillers, colorants, hydrolytic stabilizers, color stabilizers, and flame retardants.

PREFERRED EMBODIMENT OF THE INVENTION

In order to more fully and clearly illustrate the present invention, the following specific examples are presented. It is intended that the examples be considered as illustrative rather than limiting the invention disclosed and claimed herein. In the following examples all parts and percentages are on a weight basis unless otherwise specified.

EXAMPLE 1

This example illustrates the preparation of an imide end capped polycarbonate obtained by reacting a compound of Formula I, a dihydric phenol, and a carbonate precursor.

To a reactor vessel there are added 57 grams (0.25 mole) of 2,2-bis(4-hydroxyphenyl)propane, 400 milliliters of methylene chloride, 0.7 milliliters of triethylamine, 300 milliliters of water and 1.8 grams (3 mole percent) of N-(p-hydroxyphenyl)phthalimide. Phosgene is then introduced into the mixture at the rate of about one gram per minute for thirty minutes.

The polymer is precipitated, washed and dried. The resultant polymer has an Intrinsic Viscosity of 0.504 and a Glass Transition Temperature of 142° C.

EXAMPLE 2

This example illustrates the preparation of a carbonate copolymer obtained by reacting a compound of Formula II, a dihydric phenol, and a carbonate precursor.

To a reactor vessel there are added 22.8 grams of 2,2-bis(4-hydroxyphenyl)propane, 2 grams of N,N'-bis(-parahydroxyphenyl)1,2,4,5-benzenetetracarboxylic-1,2:4,5-diimide, 0.2 milliliters of triethylamine, 0.2 grams of phenol molecular weight regulator, 200 milliliters of methylene chloride, and 150 milliliters of water. Phosgene is then added to this reaction mixture at a rate of about 1 gram per minute for 15 minutes. During the addition of phosgene the pH is maintained at about 11 by addition of aqueous sodium hydroxide.

The polymer is precipitated, washed and dried. The resultant polymer has an Intrinsic Viscosity of 0.596 and a Glass Transition Temperature of 146.6° C.

It will thus be seen that the objects set forth above, among those made apparent from the preceding description are efficiently attained, and since certain changes may be made in carrying out the above processes and the compositions set forth without departing from the scope of the invention, it is intended that all matters contained in the above description shall be interpreted as illustrative and not in a limiting sense.

What is claimed is:

1. An endcapped polymer composition comprised of the reaction product of:
   (i) a dihydric phenol;
   (ii) a carbonate precursor; and
   (iii) at least one imide selected from the group consisting of imides in chain terminating effective amount represented by the general formula

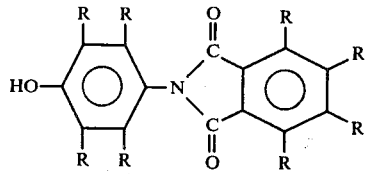

and imides in quantities of from about 1 to about 85 mole percent based on the amount of dihydric phenol represented by the general formula

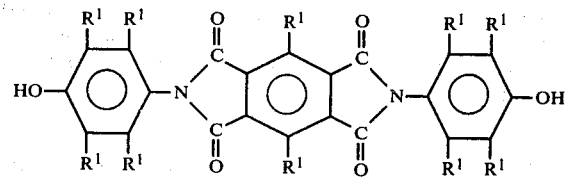

wherein each R is independently selected from hydrogen, alkyl radicals, alkoxy radicals, and halogen radicals, and wherein each $R^1$ is independently selected from hydrogen, alkyl radicals, alkoxy radicals, and halogen radicals with the proviso that at least one imide compound of the first formula is employed.

2. The composition of claim 1 wherein said carbonate precursor is a carbonyl halide.

3. The composition of claim 2 wherein said carbonyl halide is carbonyl chloride.

4. The composition of claim 2 wherein said imide is an imide represented by the general formula

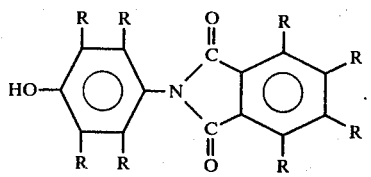

5. The composition of claim 4 wherein said dihydric phenol is bisphenol A.

6. The composition of claim 5 wherein each R is hydrogen.

7. The composition of claim 2 wherein said imide is an imide represented by the general formula

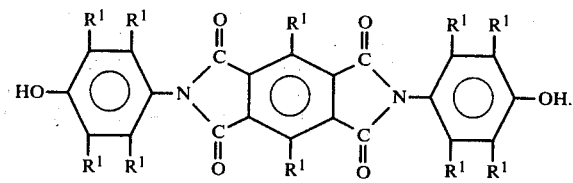

8. The composition of claim 7 wherein said dihydric phenol is bisphenol A.

9. The composition of claim 8 wherein each $R^1$ is hydrogen.

10. The composition of claim 2 wherein (iii) is a mixture of at least one imide represented by the general formula

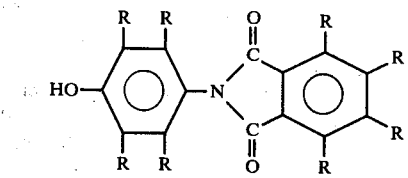

and at least one imide represented by the general formula

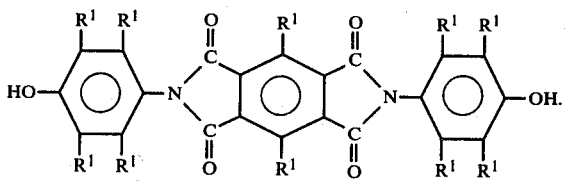

11. A copolyester-carbonate polymer composition comprised of the reaction product of:
   (i) a dihydric phenol;
   (ii) a difunctional aromatic dicarboxylic acid or its reactive derivative;
   (iii) a carbonate precursor; and
   (iv) at least one imide selected from the group of imides in chain terminating effective amount represented by the general formula

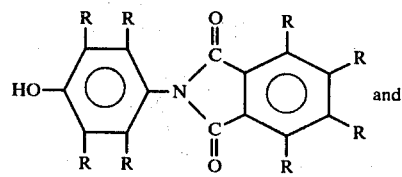 and

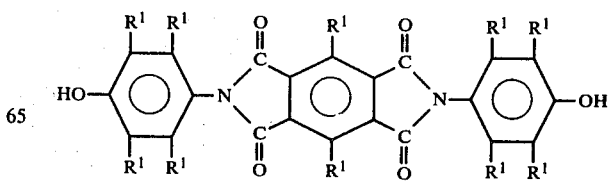

wherein each R is independently selected from hydrogen, alkyl radicals, halogen radicals and alkoxy radicals, and each $R^1$ is independently selected from hydrogen, alkyl radicals, halogen radicals and alkoxy radicals; the molar ratio of (i) plus the compound of the second formula (iv) to (ii) is in the range of 1.00:0.05 to about 1.00:0.70.

12. The composition of claim 12 wherein said carbonate precursor is a carbonyl halide.

13. The composition of claim 12 wherein said carbonyl halide is carbonyl chloride.

14. The composition of claim 13 wherein said difunctional aromatic carboxylic acid is selected from isophthalic acid, terephthalic acid, and mixtures thereof.

15. The composition of claim 13 wherein said reactive derivative of said difunctional aromatic carboxylic acid is selected from isophthaloyl halide, terephthaloyl halide, and mixtures thereof.

16. The composition of claim 14 wherein said dihydric phenol is bisphenol A.

17. The composition of claim 15 wherein said dihydric phenol is bisphenol A.

18. The composition of claim 12 wherein said imide is represented by the general formula

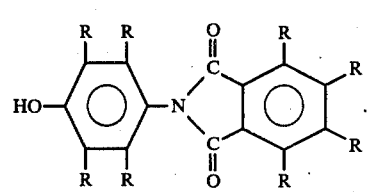

19. The composition of claim 12 wherein said imide is represented by the general formula

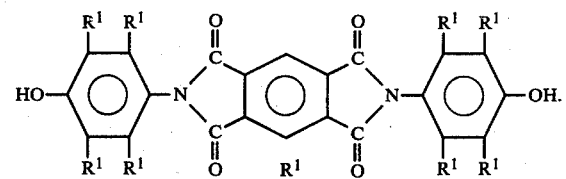

20. The composition of claim 5 wherein each R is hydrogen.

21. The composition of claim 18 wherein each R is hydrogen.

22. The composition of claim 19 wherein each $R^1$ is hydrogen.

* * * * *